2,993,761
COMPACTS OF FINELY PARTICULATE MATERIAL
Hendrik de W. Erasmus, Lewiston, N.Y., assignor to Union Carbide Corporation, a corporation of New York
No Drawing. Filed Feb. 6, 1956, Ser. No. 563,438
14 Claims. (Cl. 23—208)

This invention relates to compacts of finely particulate material and to a method of their preparation and use.

In many reactions, exemplified by those commonly encountered in furnace smelting operations, it is essential that the reactants be comminuted to extremely fine particle size. By increasing the surface area of the reactant material in this manner, a more intimate contact between the reactants is maintained, engendering increased reaction velocity.

The utilization of finely subdivided reactant material, however, creates certain disadvantages. Considerable loss in the form of fines may result which would upset the stoichiometric ratio of reactants. Consequently, it is desirable to bind the material with a suitable agent, subsequently shaping and drying the resultant mixture. For some uses, as in furnace smelting operations, the binding medium should, in addition, be sufficiently effective at elevated temperatures. The tendency to channel furnace gases within the reactant mass created by the segregation of reactant particles, is thereby eliminated. In addition, the possibility of fines further escaping to pollute the air is also precluded.

Of the binding agents finding current application, water often yields compacts of low dry strength. These compacts tend to disintegrate in the course of handling and transportation, and during the later furnacing periods. Various organic binders, such as molasses, are similarly inclined to lose their binding power at increased temperatures, causing the objectionable results previously mentioned.

It is an object of the present invention to overcome the disadavntages of the prior art by providing a compact of finely particulate material which will resist abrasion or disintegration and retain its binding characteristics at elevated temperatures.

A further object of this invention is the provision of a binding medium which is normally noncontaminating in most furnace smelting operations.

The objects of this invention are achieved by admixture of reactant material in a finely subdivided state with calcium formate in the presence of moisture. The resultant mixture is subsequently compacted and dried. In this manner, the compacts so formed demonstrate a degree of coherence sufficient to withstand abrasion and disintegration during the normal course of handling and transportation, and upon subsequent heating.

Preferably the finely particulate reactant material is admixed with an aqueous solution of calcium formate, wherein the solution may be either saturated or unsaturated. The optimum range of solute concentration is within 5 to 16.5 percent by weight.

The proportion of calcium formate to subdivided reactant, or combination of reactants may vary depending upon the particle size and nature of the reactant material but it is preferably kept within 2 to 6 percent by dry weight.

Following admixture, the resultant paste is suitably extruded or compacted into pellets or briquettes less than ¾-inch in at least one dimension. They are subsequently dried at a temperature of approximately 125° C. The conglomerates thereby become hard and rigid and in this form can be used advantageously in furnace operations.

It has been found that calcium formate is an especially suitable binding medium in the production of calcium carbide from lime hydrate. Lime hydrate is present as a residue or by-product of the generation of acetylene from calcium carbide in a state so finely particulated as to resist compaction into forms not readily subject to abrasion and disintegration. The utilization of calcium formate as a binding medium makes possible a cyclic process wherein the said lime hydrate may be pelletized and subsequently calcined and convered to calcium carbide, from which acetylene is again generated. Calcining and carbiding steps may also be performed in a single operation by the combination of lime hydrate and a carbonaceous reducing agent, such as coal or coke, in pellet form.

An application of this invention is further found in the production of high carbon ferro-alloys, for example, ferrochromium or ferromanganese, wherein ore is fused with carbon, such as coal, at high temperatures. This results in considerable loss in the form of vapor which may be offset by reaction in the solid state. By binding a mixture of finely subdivided reactants with a calcium formate solution, the ore and carbon may be pelletized and furnaced without disadvantage.

This invention will be illustrated in greater detail by description in connection with the following specific examples of its practice, but it is not to be necessarily so limited.

Example I

Residual lime hydrate from acetylene generation was admixed with a saturated solution of calcium formate, 10 percent by weight, and pelletized at 1000 p.s.i. pressure into cylindrical compacts 1-inch long by ⅝-inch in diameter. The material so formed was fed directly into a rotary kiln and calcined at 950° C. for three hours. At the termination of this period, the pellets were extracted from the furnace and cooled in air. Their appearance was retained without evidence of dusting.

Example II

Pellets for conversion to calcium carbide were made by admixture of:

| | Lb. |
|---|---|
| Lime hydrate | 7.6 |
| Soft coal (300XD mesh) | 3.4 |
| Saturated calcium formate solution | 6.4 |

Nine pounds of resultant paste was extruded into pellets ¼ by ½-inch and dried at 125° C. Simultaneous calcination and carbidation by introduction of these pellets into an arc furnace for one hour produced 4.55 lb. of calcium carbide.

Example III

Pellets for conversion to high carbon ferromanganese were made by admixture of:

| | Lb. |
|---|---|
| Indian Mn ore (100XD mesh) | 10.0 |
| Soft coal (300XD mesh) | 2.5 |
| MgO (calcined) | 0.5 |
| Saturated calcium formate solution | 5.0 |

The resultant paste was extruded into pellets ¼ by ½-inch and dried at 125° C. Reduction of the ore by subsequently charging these pellets into an arc furnace produced high carbon ferromanganese.

Example IV

Pellets for conversion to high carbon ferrochromium were made by admixture of:

| | Lb. |
|---|---|
| Transvaal chromium ore (300XD mesh) | 10.0 |
| Lime hydrate | 1.5 |
| Silica flour | 0.4 |
| Soft coal (300XD mesh) | 2.3 |
| Saturated calcium formate solution | 7.3 |

The resultant paste was extruded into pellets ¼ by ½-inch and dried at 125° C. Reduction of the ore by subsequently charging these pellets into an arc furnace produced high carbon ferromanganese.

What is claimed is:

1. A strongly bound compacted and dried mass comprising a mixture of lime hydrate and calcium formate as a binder, which is characterized by resistance to abrasion and disintegration and evidences the retention of binding power at elevated temperatures.

2. A strongly bound compact comprising a mixture of lime hydrate, a carbonaceous reducing agent and calcium formate as a binder, which is characterized by resistance to abrasion and disintegration and evidences the retention of binding power at elevated temperatures.

3. A strongly bound compacted and dried mass comprising a mixture of lime hydrate, finely divided coal, and calcium formate as a binder, which is characterized by resistance to abrasion and disintegration, and evidences the retention of binding power at elevated temperatures.

4. A strongly bound compacted and dried mass comprising a mixture of finely divided ore and coal, and calcium formate as a binder, which is characterized by resistance to abrasion and disintegration, and evidences the retention of binding power at elevated temperatures.

5. A compacted and dried mass according to claim 4 wherein said ore is at least one member selected from the group consisting of manganese and chromium ore, and contains substantial amounts of iron.

6. A strongly-bound, compacted and dried mass comprising a mixture of lime hydrate and from 2 to 6 percent by weight of calcium formate as a binder, which is characterized by resistance to abrasion and disintegration and evidences the retention of binding power at elevated temperatures.

7. A strongly-bound, compacted and dried mass comprising a mixture of lime hydrate, a carbonaceous reducing agent and from 2 to 6 percent by weight of calcium formate as a binder, which is characterized by resistance to abrasion and disintegration and evidences the retention of binding power at elevated temperatures.

8. A strongly-bound, compacted and dried mass comprising a mixture of lime hydrate, finely divided coal and from 2 to 6 percent by weight of calcium formate as a binder, which is characterized by resistance to abrasion and disintegration and evidences the retention of binding power at elevated temperatures.

9. A strongly-bound, compacted and dried mass comprising a mixture of finely divided ore and coal and from 2 to 6 percent by weight of calcium formate as a binder, which is characterized by resistance to abrasion and disintegration and evidences the retention of binding power at elevated temperatures.

10. The strongly-bound, compacted and dried mass according to claim 9 wherein said ore is at least one member selected from the group consisting of manganese ore and chromium ore.

11. In a process for the production of high carbon ferro-alloys wherein finely divided ore and coal are admixed with a binder, the mixture compacted and the compacts subjected to furnacing operations, that improvement which comprises employing calcium formate as said binder by admixing said finely divided ore and coal with an aqueous solution of calcium formate and drying the compacted mixture prior to furnacing operations at a temperature less than the decomposition temperature of said calcium formate.

12. The improvement according to claim 11 wherein said ore is at least one member selected from the group consisting of manganese ore and chromium ore.

13. In a process for the production of high carbon ferro-alloys wherein finely divided ore and coal are admixed with a binder, the mixture compacted and the compacts subjected to furnacing operations, that improvement which comprises employing calcium formate as said binder by admixing said finely divided ore and coal with an aqueous solution of calcium formate in a proportion of from 2 to 6% of said calcium formate by dry weight, and drying the compacted mixture prior to furnacing operations at a temperature less than the decomposition temperature of said calcium formate.

14. The improvement according to claim 13 wherein said ore is at least one member selected from the group consisting of manganese ore and chromium ore.

References Cited in the file of this patent

UNITED STATES PATENTS

| 120,871 | Goodrich | Nov. 14, 1871 |
| 374,560 | Saltery | Dec. 7, 1887 |
| 675,646 | Zimmerman et al. | June 4, 1901 |
| 1,292,386 | Becket | Jan. 21, 1919 |
| 1,815,464 | Fahrenwald | July 21, 1931 |
| 1,843,903 | Scott | Feb. 2, 1932 |
| 1,995,607 | Enderli | Mar. 26, 1935 |
| 2,502,418 | Collis | Apr. 4, 1950 |
| 2,616,150 | Vettel | Nov. 4, 1952 |
| 2,680,278 | Robinson | June 8, 1954 |

FOREIGN PATENTS

| 1,858,413 | Germany | May 16, 1931 |

OTHER REFERENCES

Thorpe's Dictionary of Applied Chemistry, 4th ed., 1937, vol. 5, page 325.